United States Patent [19]

Anders

[11] 4,197,268

[45] Apr. 8, 1980

[54] METHOD OF AND AN APPARATUS FOR MONITORING THE DIGASSING OPENING ON A SINGLE OR TWIN SCREW EXTRUDER FOR PROCESSING PLASTICS MATERIAL

[75] Inventor: Dietmar Anders, Hanover, Fed. Rep. of Germany

[73] Assignee: Hermann Berstorff Maschinenbau GmbH, Hannover-Kleefeld, Fed. Rep. of Germany

[21] Appl. No.: 971,590

[22] Filed: Dec. 20, 1978

[30] Foreign Application Priority Data

Dec. 27, 1977 [DE] Fed. Rep. of Germany ....... 2758265

[51] Int. Cl.$^2$ .............................................. B29F 3/03
[52] U.S. Cl. ................................ 264/40.1; 264/40.3; 264/40.7; 264/102; 425/145; 425/146; 425/147; 526/67
[58] Field of Search ............... 264/40.7, 40.3, 40.1, 264/101–102; 425/147, 145–146; 526/67

[56] References Cited

U.S. PATENT DOCUMENTS

| | | | |
|---|---|---|---|
| 3,229,445 | 1/1966 | Kraft | 264/40.3 |
| 3,244,688 | 4/1966 | Goins | 526/67 |
| 3,579,728 | 5/1971 | Reid et al. | 264/102 |
| 3,937,778 | 2/1976 | Tanaka | 264/102 |
| 4,067,554 | 1/1978 | Koch | 425/145 |

*Primary Examiner*—Jeffery R. Thurlow
*Attorney, Agent, or Firm*—Donald D. Jeffery

[57] ABSTRACT

A control device connected to rotational speed measuring means for an extruder screw, to a filling level monitor in a degassing opening of the extruder, to a cut-off in a filling container for the extruder, to vacuum means connected to the degassing opening and to a source of gas under pressure such that upon receipt from the speed measuring means or the filling level monitor by the control device of an indication of probable filling of the degassing opening with melt, the control device closes the cut-off, disconnects the vacuum means from the degassing opening and connects the gas pressure source thereto.

9 Claims, 1 Drawing Figure

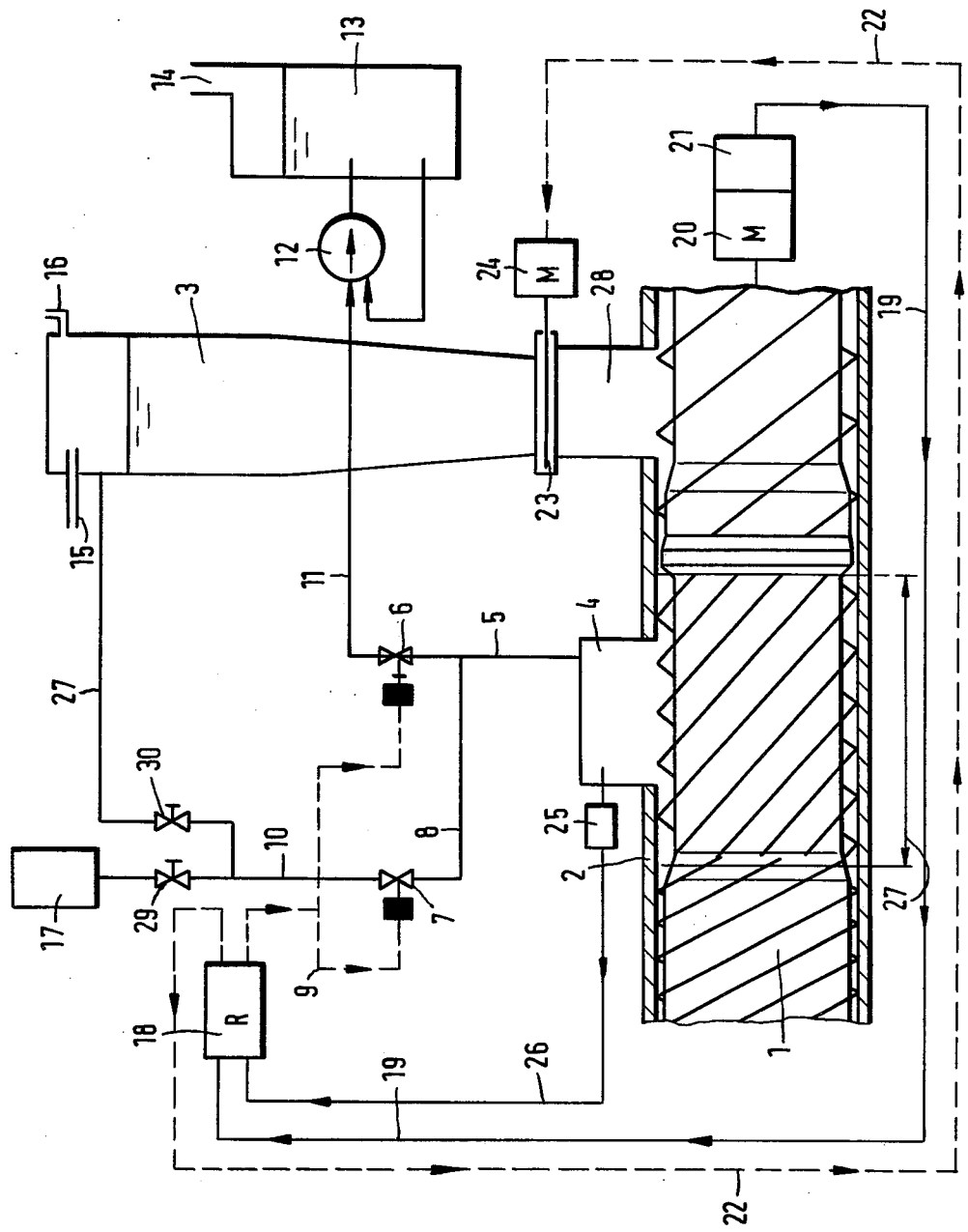

METHOD OF AND AN APPARATUS FOR MONITORING THE DIGASSING OPENING ON A SINGLE OR TWIN SCREW EXTRUDER FOR PROCESSING PLASTICS MATERIAL

The invention relates to a method of and an apparatus for monitoring the degassing opening on a single or twin screw extruder for processing plastics material.

Degassing means with attached vacuum producing means have been proposed, which permit degassing of the melt in a pressureless zone of an extruder screw. However, when the screw is stationary the melt cannot be prevented from continuing to flow out of the melt supply container and from rising up into the degassing opening, whereby the vacuum means is blocked.

Furthermore, during the complicated cleaning which is then necessitated, oxygen comes into contact with the melt on the screw and leads during the processing of HP-PE in particular to oxidation, i.e. considerable contamination. Since the screw is only cleaned slowly in operation, the total output of the extruder can be contaminated over a long period of time and thus becomes unusable.

Even if a motor-operated cut-off slide valve is disposed between the melt supply container and the extruder intake, the closing operation lasts so long that when the machine is suddenly stopped melt will rise into the degassing opening.

In order to ensure when using degassing screw extruders that the degassing zone remains pressureless, i.e. partially filled, the conveying output of a discharge zone of the extruder must be fundamentally higher than that of a zone of the extruder upstream of the degassing opening. This co-ordination is normally achieved by varying the depths of pitch of the thread, the discharge zone being, for example, 30% deeper than the intake zone. If the rotational speed of the screw is reduced, then there is a fall in the output of the intake zone which conveys material into the pressureless region, i.e. into the degassing zone, said output dropping to zero in proportion to the speed of rotation. The discharge output of the discharge zone at the front end of the screw however drops disproportionately because high pressure is required to discharge even small outputs due to the underwater granulator usually connected to the discharge end of the screw.

The result of this relationship is that despite the ideal co-ordination of both sections of the screw in normal operation, when the speed of rotation is reduced a point must come at which the discharge output of the intake section of the screw conveying into the degassing zone is greater than that of the discharge zone, which unavoidably leads to an increase in the quantity of the melt in the degassing zone.

It is among the objects of the present invention to obviate these drawbacks in single or multiple screw extruders.

It is also among the objects of the invention to ensure that in the event of an emergency stop and an inadmissible reduction in the rotational speed of the screw, it is possible to prevent plastics melt from rising into the degassing opening and clogging the vacuum means connected thereto, or it should be ensured that atmospheric oxygen cannot penetrate the degassing opening in such a case, so that oxidation phenomena which cause persistent contamination and thus large quantities of waste, particularly during the processing of LP-PE, are avoided.

With regard to the method, the problem of the present invention is solved by transmitting a signal to a control device in dependance on the rotational speed of the screw or when the degassing opening becomes partially filled, whereby the control device thereupon closes the cut-off means on the extruder hopper or on the melt container and simultaneously applies the gas pressure of the melt container under excess pressure or of an inert gas container under excess pressure to the degassing opening.

The apparatus for performing this method comprises an arrangement of a control device connected to a rotational speed measuring means on the screw drive means, a filling level monitor in the degassing opening and a drive means for the cut-off slide valve, and an arrangement of a shift mechanism connected to the vacuum means and an excess pressure means as well as an arrangement of a connection between the control device and the shift mechanism.

This solution ensures that in the event of an emergency stop or a substantial reduction in the screw rotational speed, no plastics melt rises into the degassing opening, which would cause contamination of the degassing opening itself and the vacuum means connected thereto. In this way it is also possible to avoid having to clean the degassing opening manually and thus in the presence of atmospheric oxygen.

The degassing opening is acted upon by an inert gas under excess pressure or by the gas pressure prevailing in the melt container, for the specific volume and with it the filling of the screw in the region of the degassing zone depends in the case of a melt, which contains amounts of residual gas, decisively on the absolute pressure prevailing in this region.

Assurance against incorrect operation, freezing of the cutting plate or failure of a signal which reports the inadmissible reduction in the screw rotational speed is given by the fact that a filling level monitor is provided inside the degassing opening as close to the extruder cylinder as possible on the side facing the discharge zone, which monitor actuates the shift mechanism by way of the control device and closes the cut-off slide valve. Naturally, provision is made in the event of an inadmissible reduction in rotational speed and/or in the event of melt being present in the degassing zone—indicated by the filling level monitor—for the control device or devices to indicate a failure directly and/or to switch off the main drive motor of the extruder by way of an adjustable timing relay.

Expediently the shift mechanism comprises ball stop valves controlled by the control device.

In order to ensure that during the change-over process no atmospheric oxygen can penetrate the degassing opening, a water-ring vacuum pump with complete water circulation is advantageously provided.

The source of gas pressure may comprise for example a bottle of gas under pressure, an inert gas, for example nitrogen, preferably being used so as to prevent reaction with the plastics material in the extruder.

Alternatively, the excess pressure acting upon the degassing opening may also be formed by the pressure prevailing in the melt container for LP-PE and which is applied to the degassing opening by means of appropriate pressure conduits by way of the shift mechanism.

A preferred application of the degassing means is for degassing an LP-PE melt emerging from a polymerization system and fed to the extruder by way of a low pressure separator, in order to remove residual monomers such as ethylene gas, the degassing opening being disposed between the feed opening for the melt and the discharge opening of the extruder.

By connecting the degassing means to a vacuum means and an excess pressure means by way of cut-off slide valves, which are alternatively controlled by the control device, it is possible for the first time, taking into account contamination and the imperative automatic safe operation of a single screw extruder for homogenising LP-PE, to dispose the degassing opening between the feed-in opening for the material and the extruder discharge, thus making it possible to avoid the much less effective reverse degassing connected to the extruder cylinder on the gear unit side.

An embodiment of the present invention is illustrated in schematic form in the accompanying drawing which illustrates a section of an extruder with a screw 1, a cylinder 2 and a melt container 3 having a filling pipe 15 and being disposed over a feed-in opening 28. A degassing opening 4 is connected to a ball stop valve 6 by means of a pressure line 5 or to a second ball stop valve 7 by means of a pressure line 8. A line 9 connects the ball stop valve 7 to a control device 18, which in turn is connected by a line 19 to a rotational speed measuring means 21 of drive means 20 for the screw 1. A nitrogen pressure container 17 is connected to the ball stop valve 7 by means of a pressure line 10.

A pressure line 11 establishes a connection between the ball stop valve 6 and a water-ring vacuum pump 12, which in turn is connected to a water container 13. Ethylene gas drawn in by the vacuum pump 12 is preferably delivered from the degassing system to a gas collecting container by way of a gas outlet 14 of the water container 13 and can be supplied once more to the polymerisation process.

When the ball stop valve 6 is in an open position the degassing opening 4 is connected to the water-ring vacuum pump 12 by way of the lines 5 and 11, so that the LP-PE melt coming from the melt container 3 into the extruder cylinder 2 is continuously degassed.

When the speed of rotation of the screw 1 is substantially reduced, for example to less than 50% of the maximum speed, or when a filling level monitor 25 indicates, to the control device 18 by way of a line 26, melt filling in the degassing opening 4, the control device 18 is actuated to close the ball stop valve 6 to interrupt the vacuum action and to open the ball stop valve 7 to cause the nitrogen pressure from the pressure container 17 to be applied to the degassin opening 4 by way of the pressure lines 10, 8 and 5. Furthermore, the control device 18 simultaneously closes a cut-off slide valve 23 in the melt container 3 by acting upon drive means 24 therefor by way of a line 22 so that the flow of melt out of the melt container 3 is directly interrupted.

In this way it can be reliably ensured that in the event of a reduction in rotational speed or of melt rising in a degassing zone 27 for another reason, melt cannot emerge from the degassing opening 4.

When the ball stop valve 7 is in a closed position, the pressure in the nitrogen container 17 only reaches the ball stop valve 7 by way of the pressure line 10 if a valve 29 is open.

Alternatively, the pressurised gas container 17 can be put out of operation by closing the valve 29 and, by opening a valve 30, the pressure existing in the melt container 3, which is designed as a low pressure separator, can be used as a source of excess pressure, that is to say the ethylene gas pressure. An ethylene gas outlet 16 on the low pressure separator 3 is provided with a valve (not shown), which maintains the pressure of the ethylene gas in the low pressure separator 3 at a constant pressure above the level of the LP-PE. According to the process used and the method of returning the ethylene gas to the polymerisation process, excess pressures of between 0.2 and 6 bars are normal in practice. The ethylene gas pressure can be applied in such a case to the degassing opening 4 by way of a pressure line 27 and the pressure lines 8 and 5 by opening the valve 30 and opening the ball stop valve 7.

If the excess pressure present in the low pressure separator 3 is used to apply pressure to the degassing opening 4, then the nitrogen container 17 can be dispensed with.

What is claimed is:

1. A method of preventing filling of a degassing opening, of an extruder for processing plastics material, with plastics melt, said extruder having a housing; an extruder screw disposed in said housing; drive means and rotational speed measuring means for said extruder screw; a filling container disposed upon said housing and including cut-off means to cut-off supply of plastics material from said filling container to said housing; a filling level monitor disposed in said degassing opening and vacuum means connected to said degassing opening; the method comprising the steps of supplying a signal to a control device upon occurrence of a probable filling of said degassing opening with plastics melt and causing said signal to cause said control device to operate said cut-off means of said filling container, to close a vacuum line connecting said vacuum means to said degassing opening and to apply gas, from a source of gas under excess pressure, to said degassing opening.

2. A method as claimed in claim 1, wherein said signal is supplied to the control device by said rotational speed measuring means of the screw upon reduction in speed of rotation of the extruder screw below a determined level.

3. A method as claimed in claim 1, wherein said signal is supplied to the control device by said filling level monitor disposed in the degassing opening upon a rise above a determined level of the plastics melt in the degassing opening.

4. Apparatus for preventing filling of a degassing opening, of an extruder for processing plastics material, with plastics melt, said extruder comprising a housing; an extruder screw disposed in said housing; drive means and rotational speed measuring means for said extruder screw; a filling container disposed upon said housing and including cut-off means to cut-off supply of plastics material from said filling container to said housing; a filling level monitor disposed in said degassing opening; vacuum means connected to said degassing opening; a control device; a valve shift mechanism and a source of gas under pressure, said control device being connected to said rotational speed measuring means, connected to said filling level monitor and connected to said cut-off means such that upon receipt by said control device of an indication, from one of said rotational speed measuring means and said filling level monitor, of a probable filling of said degassing opening with plastics melt, said control device effects operation of said cut-off means and operation of said valve shift mechanism to disconnect said vacuum means from said degassing opening and to connect said source of gas under pressure to said degassing opening.

5. Apparatus as claimed in claim 4, wherein said valve shift mechanism comprises ball stop valves controlled by said control device.

6. Apparatus as claimed in claim 4, wherein said vacuum means is a water-ring vacuum pump with complete water circulation.

7. Apparatus as claimed in claim 2, wherein said source of gas under pressure is a container filled with nitrogen under pressure.

8. Apparatus as claimed in claim 2, wherein said source of gas under pressure is a low pressure separator for LP-PE, which is under an ethylene excess pressure of 0.2 to 6 bars.

9. Apparatus as claimed in claim 4, when used for degassing, for the purpose of removing non-polymerised ethylene gas, LP-PE melt coming from a polymerisation system and being supplied to said extruder by a low pressure separator, wherein said degassing opening is disposed between a feed-in opening for the melt and a dishcarge opening of said extruder.

* * * * *